Aug. 25, 1931.　　T. A. PEEBLES　　1,820,580
COMBUSTION CONTROL SYSTEM
Filed May 9, 1929　　5 Sheets-Sheet 2

INVENTOR
Thomas A. Peebles
By Green & McCallister
His Attorneys

Fig. 3.

Aug. 25, 1931.    T. A. PEEBLES    1,820,580
COMBUSTION CONTROL SYSTEM
Filed May 9, 1929    5 Sheets-Sheet 4

INVENTOR
Thomas A. Peebles
By Green & McCallister
His Attorneys

Patented Aug. 25, 1931

1,820,580

UNITED STATES PATENT OFFICE

THOMAS A. PEEBLES, OF MOUNT LEBANON, PENNSYLVANIA, ASSIGNOR TO JOHN M. HOPWOOD, OF DORMONT, PENNSYLVANIA

COMBUSTION CONTROL SYSTEM

Application filed May 9, 1929. Serial No. 361,657.

This invention relates to furnaces and more particularly to a system for regulating and controlling combustion therein.

An object of this invention is to provide a control system of the type set forth constructed and arranged for automatic regulation of combustion in furnaces such, for example, as boiler furnaces, although it will be obvious that the invention is not limited to use with such furnaces only.

A further object is to provide a system having automatic regulation of the various elements employed in operating one or a battery of furnaces and at the same time permitting not only manual control of the entire plant as a whole, but independent manual control of any given element whether or not the other elements are automatically or manually controlled.

These and other objects which will be apparent to those skilled in this particular art are attained by means of the invention illustrated in the accompanying drawings in which;

The present invention is adapted to provide a control system for furnaces such, for example, as boiler furnaces and is especially advantageous when employed with a battery of such furnaces, although it will be apparent that the present arrangement is equally applicable to the control of a single unit and is not limited to use with any particular type of furnace.

The particular embodiment of this invention which has been chosen for the purposes of illustration includes a master regulator which is responsive to variations in the plant load for the purpose of controlling and varying combustion in the entire battery of furnaces in accordance with such variations. The operation of the master regulator in response to the varying load conditions is transmitted directly to local regulators associated with each of the furnaces in the plant, through a fluid pressure system of such construction and arrangement that the pressure therein is varied by the master regulator in proportion to the change in the plant load.

The master regulator, in other words, controls a sending device which transmits an impulse to each of the local boiler panels, and local regulators on each of the local regulating panels receive this impulse and in turn transmit it through separate sending devices to the various regulators controlling the fuel feed, the air supply, etc. of the associated furnace. In this way combustion in each furnace of the battery is simultaneously increased or diminished as a result of an increase or decrease in the plant load. Mechanism is associated with the master control panel for manually increasing or decreasing the plant output and also for placing the entire plant under manual control instead of the automatic control of the master regulator in an emergency. Provision is made at each boiler panel for the independent adjustment of the various sending devices controlling the operations of the coal feed, air supply, stack damper, or the like, and any or all of them can be placed on manual control whenever necessary or desirable.

As a result of this arrangement a local control panel is associated with each furnace and from this panel an operator has immediate and complete control of every element entering into the combustion taking place in the associated furnace. Each local panel is influenced from the centrally located master panel which automatically determines the rating at which all boilers must operate in order to meet the demand on the plant. From the central panel it is possible to manually adjust the rating on all boilers or to throw the entire plant from automatic to manual control in case of emergency. The individual adjustment of the various units for securing the correct fuel and air ratio, or to modify the response of an individual boiler to the operation of the master regulator, is obtained by a proper manipulation of the local controls associated with each local boiler panel. Such an adjustment, made at one local panel, does not affect the adjustment at any other boiler panel.

For the purpose of simplifying the present disclosure, the present application describes an arrangement especially adapted for use in connection with boiler furnaces and in which the master regulator is directly responsive to and operated by variations in the steam pressure of the common header receiving steam from all boilers in the plant. However, it will be apparent that the present invention is equally applicable to other arrangements and may be employed in connection with an unlimited variety of installations.

As illustrated, a master regulator 10 is directly responsive to variations in the plant load through a pipe 11 connecting the diaphragm chamber of the regulator with the steam header receiving steam from all furnaces of the plant. The master regulator illustrated is constructed in accordance with that disclosed in Patent No. 1,371,243, granted March 15, 1921 to John M. Hopwood, except that the vertically moving frame of the Hopwood regulator is eliminated and the weighted lever 12, which moves in response to variations in the steam pressure delivered to the regulator through the line 11, is connected by a flexible link 13, hereinafter described in detail, directly to the operating lever 14 of a sending device 15 which is associated with the master regulator for operating each of the local boiler units in accordance with and proportionately to movement of the master regulator 10.

Figures 6, 9:
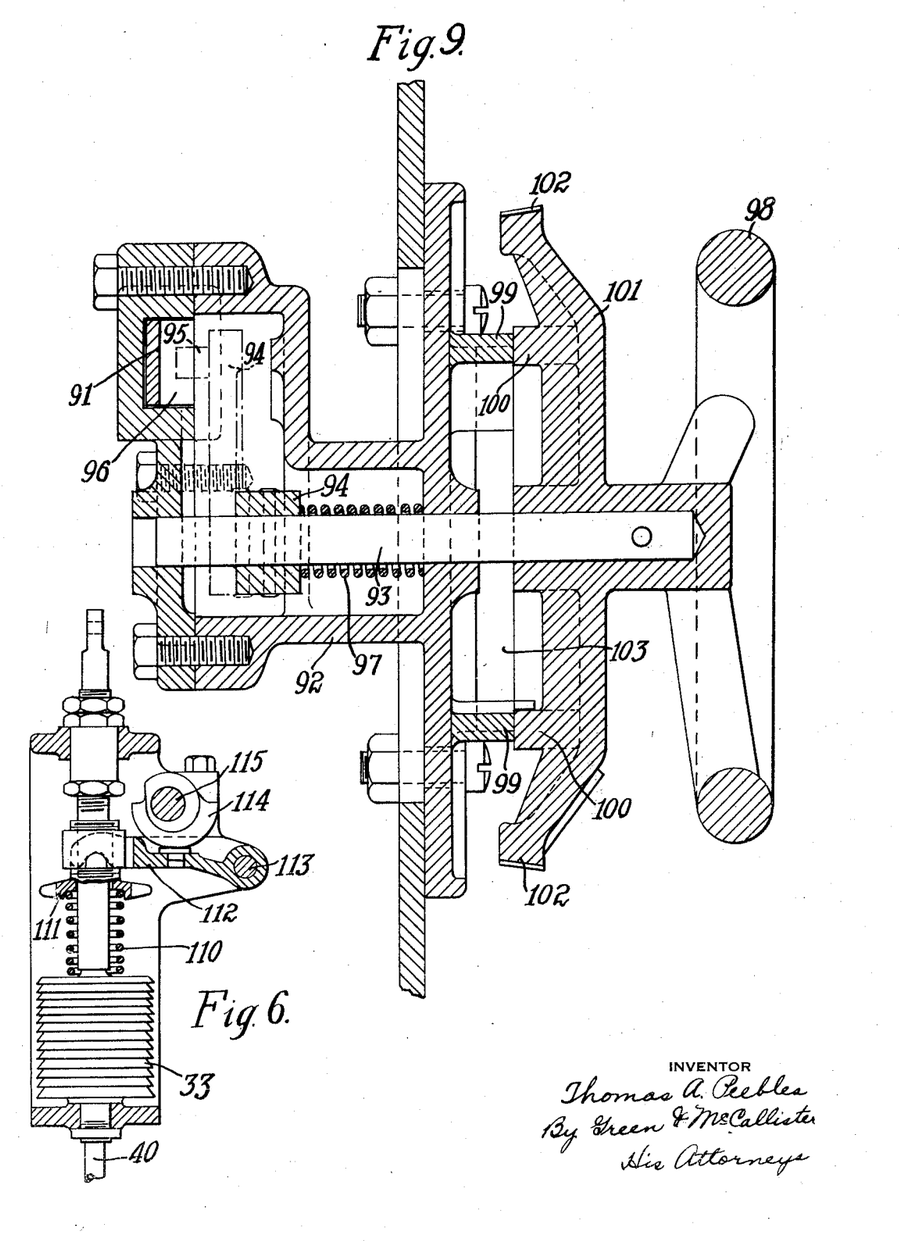
Fig. 6 is a similar view taken on line VI—VI of Fig. 5.
Fig. 9 is a sectional view on the line IX—IX of Fig. 2.
Figure 7:
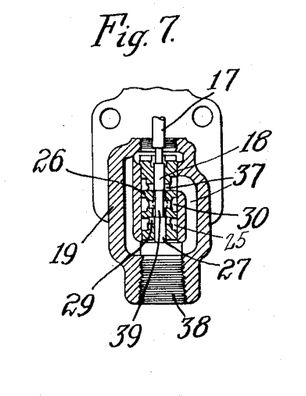
Figs. 7 and 8 are sectional views at right angles to one another of certain valve details.
Figure 8:
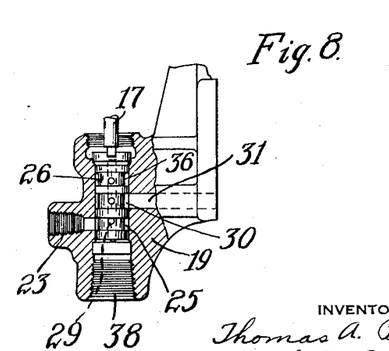

The opposite end of the lever 14 is connected by suitable connecting links 16 to a valve stem 17 forming part of a valve plug 18, see Figs. 7 and 8, slidably mounted in a valve housing 19 having an inlet port 23 connected by a line 24 with any suitable source of fluid pressure (not shown). The inlet port 23 communicates with an annular channel 25 formed in a valve member 26 mounted in the bore of the valve housing. The valve member 26 has an inner bore 27 in which the valve plug 18 has a sliding fit and with which the annular channel 25 communicates through a port 29. The valve member 26 has an annular channel 30 communicating with a passage 31 leading to the interior of a metal bellows 33, see Figs. 5 and 6, connected to the top of which is a sliding rod 34 which extends upwardly and is pivotally connected to an intermediate portion of the sending device operating lever 14. The valve member 26 has a third annular space 36 which communicates with the inner bore 27 of the valve member and which is also in open communication through passages 37 with an exhaust port 38 in the bottom of the valve housing 19. The valve plug 18 is so formed with a reduced portion 39 that the passageway 31 communicating with the passage 30 in the valve member 26 will be cut off from both the pressure supply port 29 or inlet port 23 and also cut off from the exhaust passages 37 and port 38, when the valve plug is in its central balanced position, as illustrated in Figs. 7 and 8. However, the slightest movement of the valve plug 18 in either direction will place the passage 31 and the interior of the metal bellows 33 in communication with either the pressure supply line through the inlet port 23 or with the atmosphere through port 38, depending upon whether the movement of the plug 18 is up or down from its central balanced position.

The interior of the metal bellows 33 of the sender is connected through a pressure line 40 with the local furnace regulators associated with the different furnaces in the plant. It will be apparent that variations in steam pressure transmitted to the master regulator through the pressure line 11 will cause the movable lever 12 of the regulator to rise and fall in accordance with variations in the plant load. Such movement of the regulator causes the operating lever 14 to be shifted in one direction or the other about its central pivot on the slide rod 34. This, in turn, causes the valve plug 18 to be raised or lowered so that pressure is either delivered to the bellows 33 and to the associated line 40 or pressure is exhausted therefrom. Assuming that the valve plug 18 is lowered so as to connect the inlet port 23 in the housing with the passage 31, pressure will be admitted to the metal bellows 33, which will expand and raise the slide rod 34 and lever 14 until the latter is returned to balanced position, by which movement the valve plug 18 has also been returned to its central balanced position. The result has been an increase in pressure in the bellows 33 and the associated fluid pressure line 40, resulting in an increased pressure being delivered through the line 40 to the local boiler regulator so as to cause the desired operation thereof. In other words, the pressure in line 40 is raised or lowered as a result of, and in accordance with, any increase or decrease in the pressure in plant header; that is to say, in accordance with variations in the plant load and in proportion to such variations.

Figure 1:
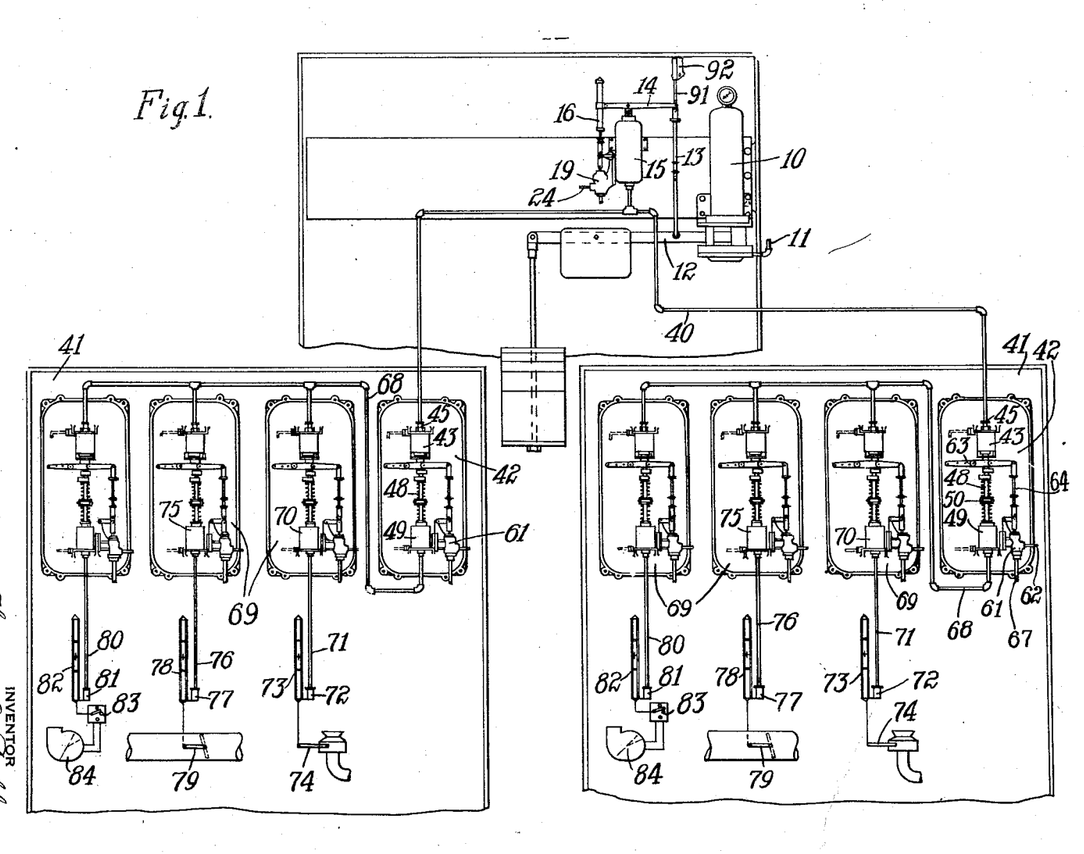
Figure 1 illustrates diagrammatically the layout of an apparatus constructed and arranged in accordance with one embodiment of this invention.
Figure 2:
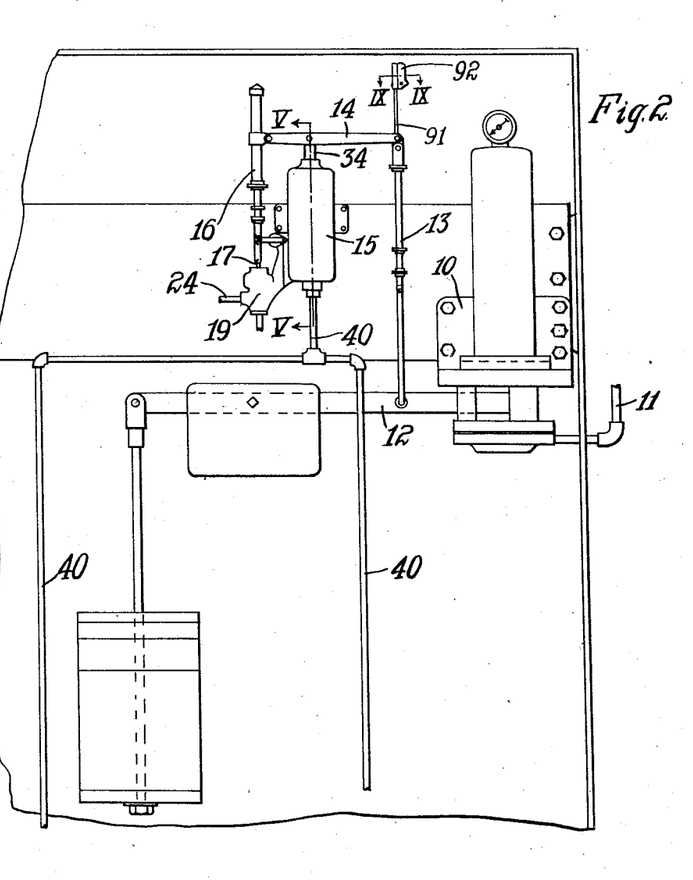
Fig. 2 is an enlarged view of the back of the master control panel showing the apparatus arranged to coordinate and control the operation of one or more of the boiler furnaces forming the associated plant.
Figure 3:
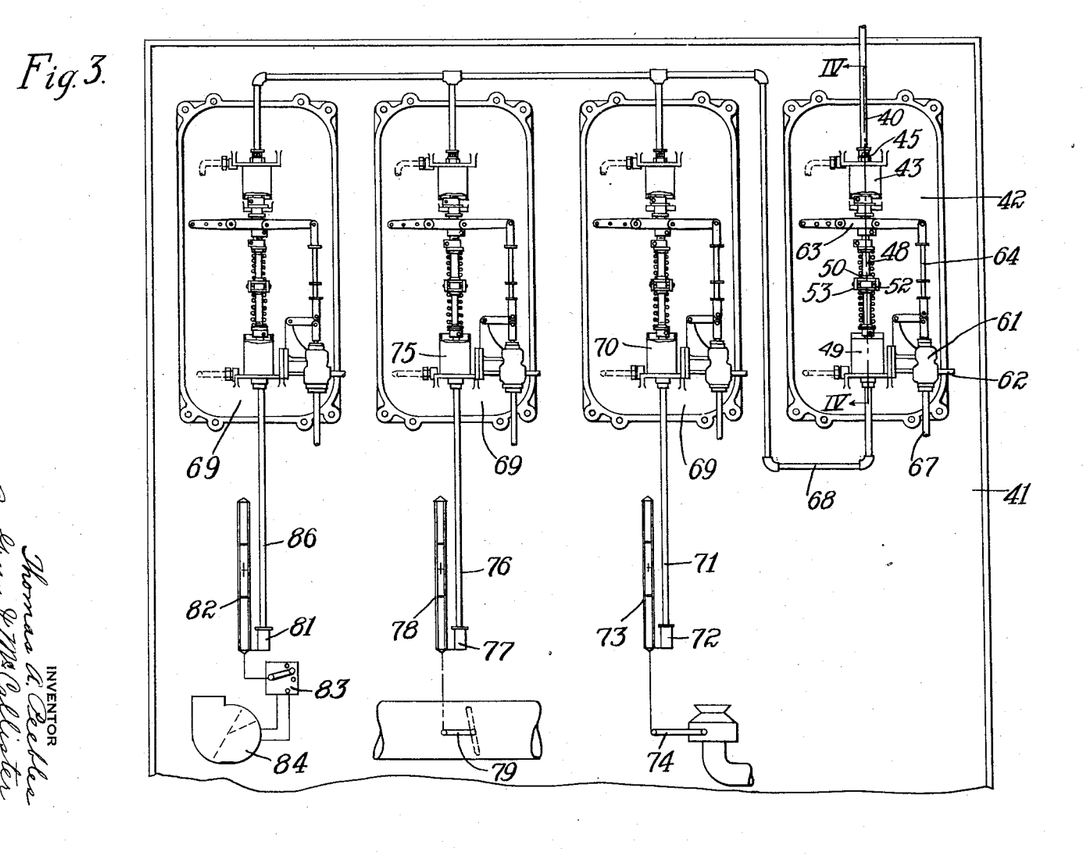
Fig. 3 is a similar view of a local boiler panel illustrating an arrangement for transmitting impulses received from the master control panel to the various regulators for operating and controlling such factors as fuel feed, air supply, etc.

In the diagrammatic layout of Fig. 1, two local boiler panels are shown for controlling the combustion in the separate associated boiler furnaces. The arrangement of each local boiler panel is identical and the mechanism associated with each is similar in every way. Each local panel 41 has a receiving regulator 42 supported on suitable brackets secured to the back thereof. Each local regulator 42 has an upper expansible bellows 43, see Figs. 1, 3 and 4, the interior of which is connected at the top by a pipe 44 with one port of a three way valve 45, the valve plug of which is operated by a control handle 46 to connect the interior of the bellows 43 either with the atmosphere through an exhaust port 47 or with the pressure line 40 which connects the other port of the three way valve with the bellows 33 of the master regulator. The lower end of the bellows 43 is movable and connected to a slide rod 48 which extends downwardly and is connected at its lower end to the movable top of a lower expansible bellows 49. A collar 50 slidably surrounds the rod 48 and a groove 51 in the collar receives pins 52 of a yoke 53 formed on the end of an angular lever 54 mounted on a pivot 55 and connected at its other end to a nut 56 threaded on a shaft 57 adapted to be rotated by a suitable hand wheel 58 on the front of each boiler panel 41. A helical spring 59 surrounds the slide rod 48 and engages the yoke 50 at one end and a collar 59 secured to the slide rod at the other end. A second spring 60 surrounds the slide rod and is interposed between the top of the lower bellows 49 and the lower end of the collar 50. It will be apparent that operation of the hand wheel in one direction or the other will swing the pivoted lever 54 so as to move the collar 50 up or down to such a position that there will be a greater pressing force upon one bellows than on the other, depending upon the direction of movement of the lever 54. At the same time, the pressure can be equalized by the proper positioning of the spring controlling lever.

The lower bellows has a valve 61 associated therewith which is similar in all respects to the valve 19 forming a part of the master regulator sending mechanism. The interior of the valve communicates through a passage, similar to the passage 31, with the interior of the bellows 49 and is adapted to receive fluid pressure from any desired source (not shown), through a pressure inlet line 62. The valve is operated by a valve operating lever 63 mounted upon a stationary pivot at one end and connected at the other end through link 64 to the valve stem. The center portion of the valve operating lever 63 is bifurcated as shown at 65, Fig. 4, to engage a collar 66 connecting the bifurcations to the slide rod 48 so that movement of the rod 48 will serve to operate the valve 61 either for increasing the pressure in the bellows 49 by connecting the interior thereof with a fluid pressure line 62 or for decreasing the pressure in the bellows by connecting the interior thereof with the atmosphere through the exhaust line 67. The interior of each bellows 49 is connected to a pressure line 68 which transmits pressure impulses or variations received by each local regulator 42 to the various receiving regulators for operating the individual coal and air controls associated with that particular furnace.

Assuming the apparatus constituting a local regulator 42 as being in a state of equilibrium, it will be apparent that pressure variations which occur in the pressure line 40 and result from operation of the master regulator will be transmitted directly to the upper bellows 43 of each local boiler panel regulator 42. The expansion or contraction of the upper bellows will result in downward or upward movement of the slide rod 48 and operate the associated valve 61 so as to deliver additional pressure to, or reduce the pressure in, the lower bellows 49 and its associated pressure line 68. In other words, pressure variations in the line 40 resulting from operations of the master regulator in response to local conditions on the plant cause similar and proportional variations in the pressure line 68 connected at each boiler panel with the local receivers 42. The pressure impulses or variations which are sent out through the line 68 from each of the local regulators 42 are conveyed to any number of different receivers 69 which are identical in construction with the regulator 42 and which operate to send pressure variations received from the associated regulator 42 to associated receivers which are connected to various control devices for initiating and controlling the operation thereof. For example, the lower bellows 70 of the first of the sending devices 69 is connected through a pressure line 71 with a pressure chamber 72 of a coal feed regulator of standard construction, the vertically movable frame 73 of which is directly connected to the coal feed control lever 74 for increasing or diminishing the supply of coal fed to the associated furnace in accordance with variations in pressure transmitted to the first sending device 69 through the line 68. A second sending device 69 has its lower bellows 75 connected through a pressure line 76 with the pressure chamber 77 of a damper operating regulator, the vertically movable frame 78 of which is connected directly to a damper operating lever arm 79 for controlling the induced draft on the associated boiler unit. The third sender 69 has its lower bellows connected through a pressure line 80 with the pressure cylinder 81 of a regulator, the vertically movable frame 82 of which controls the rheostat 83 for governing the operation of a forced draft mechanism 84.

Through the mechanism described, it is apparent that pressure impulses received by each local regulator 42 associated with each local boiler panel result in similar and proportionate variations in pressure in the line 68, which in turn cause operation of the various devices governing combustion conditions in the associated furnace, such as the rate of coal feed, induced draft, forced draft, etc.

Figures 5, 10:
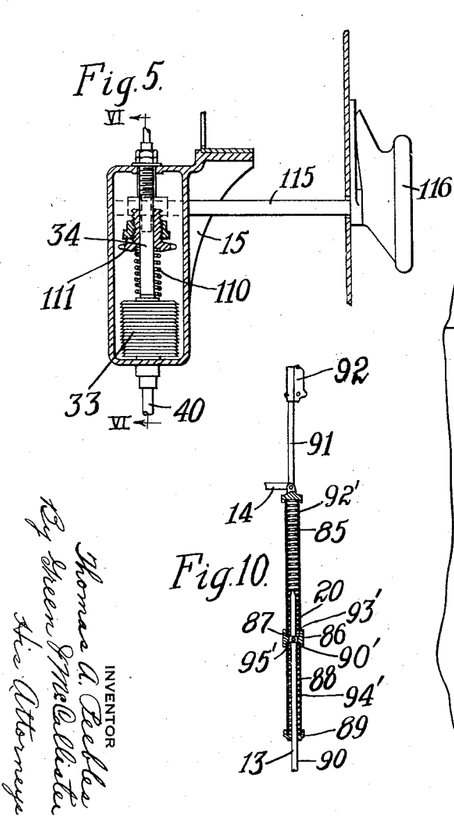
Fig. 5 is a view in section taken on the line V—V of Fig. 2.
Fig. 10 illustrates certain details of construction.

Mechanism is provided at the master control panel for changing the control of the entire plant from automatic to manual in case of emergency. As illustrated, this mechanism includes a control device utilizing the flexibility of the flexible link 13, which is provided, as above described, for actuating the valve operating lever 14 from the weighted lever 12. As illustrated in Fig. 10, the link 13 includes a barrel 85 connected to the lever 14 and secured at its lower end to a coupling member 86 having an annular portion 87 which forms an annular shoulder at the lower end of the barrel 85. A lower barrel 88 is connected to the coupling 86 and its lower end is closed by a collar 89. A connecting rod 90, suitably secured to the adjacent portion of said lever 12 extends upward through the lower barrel 88 and projects into the interior of the upper barrel 85. A collar 90' is secured to the connecting rod 90 so as to be normally positioned within the annular member 87. A helical spring 92' is located in the upper barrel between the upper coupling and a washer 93' loosely positioned in the barrel and pressed by the spring against either the shoulder formed by the annular member 87 or against the collar 91' on the connecting link. A second helical spring 94' is located in the lower barrel between the nut 89 and an annular washer 95' similar to the washer 93'. The same end of the valve operating lever 14 to which the link 13 is secured is also connected to a rod 91 extending upwardly above the valve operating lever and slidably positioned in a casing 92 mounted on the master panel. The casing encloses a shaft 93 extending through the panel and having a crank 94 mounted on the inner end of the shaft. The crank is provided with a pin 95 adapted to be moved into and out of a slot 96 in the slide rod 91 by shifting the shaft inwardly or outwardly. A coil spring 97 is provided between the crank of the hub arm 94 and a part of the frame 92 so as to press the shaft and pin inwardly toward slot engaging position.

A hand wheel 98 is secured to the front end of the shaft for rotating the same, and means is provided for holding the shaft against the pressure of the spring 97 in such position that the pin and slot are disengaged to permit free movement of the rod 91. As illustrated, this means includes diametrically opposed arcuate shoulders 99 adapted to engage similarly formed shoulders 100 on the bottom of a clutch disk 101 secured to the shaft 93 and illustrated as formed integrally with the hand wheel 98. By pulling the hand wheel outwardly to the right in Fig. 9, and rotating the same a part of a revolution the shoulders 99 and 100 are brought into operative position as illustrated. In this position the pin 95 has been moved out of engagement with the slot 96 to allow free movement of the rod 91 whereby the valve operating lever 14 is actuated automatically through the yielding connection 13 by the master regulator. When it is desired to change the control to manual, the hand wheel 98 is located so as to move the shoulders 100 off the shoulders 99 and permit the spring 97 to shift the shaft 93 to the left in Fig. 9. This permits the pin 95 to mesh with the slot 96 so as to form a rigid connection between the hand wheel 98 and the valve operating lever 14. Obviously, operation of the hand wheel results in manual shifting of the valve operating lever. Movement of the weighted master regulator lever 12 has no effect other than compressing one or the other of the springs 92 and 94 in the flexible link 13. When the pin 95 is in slot engaging position the grooved faces 102 engage similarly formed arcuate grooved faces 103 on the frame 92 so as to frictionally hold the hand wheel 98 in adjusted position. Obviously, rotation of the latter one way or the other causes operation of the sending mechanism and valve 19 to increase or decrease the pressure in the pressure line 40 connecting the sending mechanism with the receivers on the individual local boiler panels.

Each three way valve 45 associated with each local boiler regulator 42 also constitutes a means permitting manual operation or control of each boiler irrespective of the control or operation of the other furnaces in the plant. It will be apparent that when the three way valve is turned so as to connect the interior of the upper bellows 43 with the atmosphere through the outlet 47 all communication between the pressure line 40 and the bellows is interrupted and no variation of pressure occurs in the latter. Under such circumstances operation of the hand wheel 58 will vary the pressure of the spring 60 on the lower bellows 49 causing the latter to expand or contract and in turn raising or lowering the associated slide rod 48 so as to operate the associated valve 61 through the lever 63 and link 64 to vary the pressure in the pressure line 68 leading to the various local regulators in accordance with the operation of such hand wheel. In the same way, each of the local sending devices 69 can be manually operated independently of any of the other associated devices, in this way permitting coal feed, air blast, or any other element being thrown on manual control without affecting the automatic control of the other elements entering into the combustion of the furnace.

Mechanism is provided for manually adjusting the plant rating from the master panel. The sending device 15 is provided with a spring 110 located between the top of the metal bellows 33 and a collar 111 slidably surrounding the slide bar 34. A lever 112 mounted on a pivot 113 engages the opposite sides of the collar and a cam 114 on a shaft 115 provided with a hand wheel 116 on the front of the master panel varies the position of the cam lever 112 and correspondingly varies the pressure of the spring 110 upon the metal bellows. Obviously, variation of the spring pressure on the metal bellows causes the same to expand or contract, resulting in a corresponding raising or lowering of the slide bar 34 and corresponding operation of the valve 19 resulting in a predetermined variation in the pressure delivered by line 40 to the receiving regulators at the local panels. It will be apparent that this provides a simple way of manually changing the rating at which the entire plant is operating at any given time.

Figure 4:
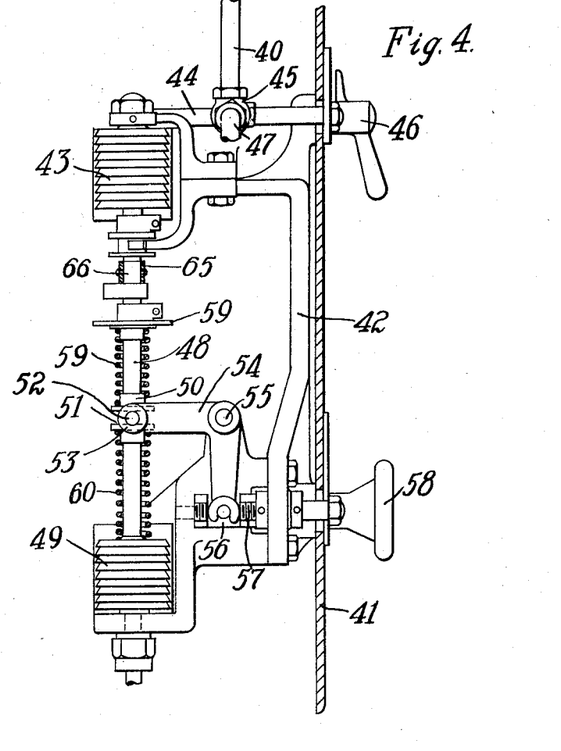
Fig. 4 is a partial view, in transverse section, on the line IV—IV of Fig. 3.

The rating of any given furnace unit above or below the rating of other units, or of the plant as a whole, and independently thereof, can be varied through operation of the hand wheels 58 associated with each of the local receivers or regulators 42. Referring to Fig. 4, it will be apparent that operation of the hand wheel such as to swing the lever 54 to the left will increase the pressure of the rod 48 upon the upper bellows 43 and decrease the pressure on the lower bellows 49 with the result that a substantially higher variation in pressure or pressure impulse is required in the line 40 to cause the receivers 42 to transmit impulses to the local boiler regulators through the associated pressure line 68. Hence, for a given impulse in the line 40, a materially smaller pressure will be transmitted by any particular regulator 42. Such operation of the hand wheel 58 occasions a decrease of pressure in the pressure line 40 and associated bellows 43 so that the rating of the particular boiler furnace in question will be advanced ahead of the rating of the other boilers, the hand wheels of which have not been shifted. In the same way, by so operating the hand wheel 58 that lever 54 is swung downwardly, to the left in Fig. 4, a greater spring pressure will be applied to the lower bellows 49, having the effect of an increased pressure in the pressure line 40, which is transmitted through the associated pressure line 68 to the various associated regulators. At the same time, the increased pressure on the lower bellows 49 has the effect of requiring a lower pressure variation in the pressure line 40 to effect variations in the line 68 controlling the local boiler regulators.

In operation, it will be readily understood that variations in load on the plant, that is to say, in the demand for steam, will cause variations in the pressure in the steam header receiving steam from the various boiler units. These variations in pressure are transmitted directly to the diaphragm chamber of the master regulator 10 through the pipe connection 11. The particular position of the master regulator with relation to any given steam header pressure is controlled or determined by the weights employed on the lever arm 12. With a relatively large weight, a relatively high steam pressure is required for operating the master regulator, while a small weight permits operation of the regulator on low steam pressure. Assuming an increased demand for steam, the steam pressure in the plant header will fall, causing the master regulator to shift the weighted lever 12 so as to cause a movement through the yieldable connection 13 of the pivoted valve operating lever 14 such as to cause the valve plug 18 to be raised, the central pivot of the valve operating lever being at that moment stationary. This valve movement connects the exhaust port 38 with passage 31 leading to the interior of the associated metal bellows 33, decreasing the pressure therein and decreasing the pressure in the pressure line 40 which connects the sending device with the various receiving regulators at the various local boiler panels. Decreased pressure in the bellows 33 contracts the same, lowering the slide rod 34 and the central pivot of the valve operating lever 14. The pivotal connection between the lever 14 and the yielding link 13 being stationary at this time, the downward movement of the slide rod 34 causes downward movement of the lever pivoting around its end connection with the link 13. This lowers the valve stem and returns the valve to its balanced central position. In other words, the increase in plant load and decrease in steam pressure has caused the master regulator to so operate the sending device, that the pressure to the receiving regulators 42 associated with each local boiler panel, is reduced. This decrease of pressure in the upper bellows 43 of each local regulator 42 causes contraction of the upper bellows and raises the slide rod 48, in turn causing the lever 63 to swing upwardly so as to raise the link 64 and operate the associated valve 61 to connect the interior of the lower bellows 49 with the exhaust port 67. The delivery of decreased pressure to the interior of the bellows 49 causes the latter to contract, in turn lowering the slide rod 48 and returning the lever 63, link 64 and valve 61 to balanced condition. This operation has caused a reduction in pressure in line 68 which is connected to the interior of the lower bellows 49, and through this pressure line 68 the effect of such reduced pressure impulse is conveyed to each of the local receivers 69.

Each of these receivers being similar to the receiver 42, the operation of each receiver is similar and a reduced pressure impulse is conveyed from the various local receivers 69 to the associated regulators 73, 78 and 82 for increasing the feed of coal and the supply of air to the associated furnace.

This operation occurs at each of the local boiler panels and the rating on each boiler furnace is correspondingly increased, resulting in an increased delivery of steam to the plant header. This increased delivery only results in such raising of the pressure in the main header as to operate the master regulator 10 and cause such operation of the valve operating lever 14 as to connect the associated air passage 31 with the inlet passage 23 in the valve housing, permitting air to enter the bellows 33, thereby raising the pressure therein. Bellows 33, therefore, expands, spring 110 is compressed and the slide bar 34 raised, causing the valve operating lever to pivot about its connection with the link 13 and raise the valve stem so as to return the valve to its balanced neutral position. This operation causes the pressure in the pressure line 40 to be increased, with corresponding operation of the local receiving regulations 42 which operate the associated receivers 69 to increase the pressure in the associated lines 71, 76, 80, respectively, in turn operating the associated local regulators 73, 78, 82 to correspondingly reduce the delivery of air and coal to the associated boiler furnace.

The rating on the entire plant can be adjusted manually from the master panel by operation of the hand wheel 116 (see Fig. 5) which, through the cam 114, causes variations in the pressure of the spring 110 on the bellows 33, resulting in expansion or contraction of the bellows and a corresponding raising or lowering of the slide bar 34 so as to operate the associated valve mechanism and increase or decrease the pressure in the line 40 with corresponding operation of the local receiving regulators 42. Similarly, the hand wheels 58 associated with each of the local receiving regulators 42 can be manually operated so as to cause the desired operation of the associated regulators 69 for changing the rating of any local boiler furnace. Obviously, this permits the rating on any given boiler to be manually set ahead or behind the rating on the rest of the plant, irrespective of such rating and irrespective and independent of the rating on any other given boiler furnace.

In connection with each of the local sending devices 69, similar hand wheels, identical in all respects to the hand wheel 58, are provided so that any or each of such devices can be operated manually to increase or decrease the air supply, the coal supply, or any other factor subject to the regulation of the associated sending device.

The entire plant can be shifted from automatic to manual control by rotating the hand wheel 98 so as to move the shoulders 100 away from the shoulders 99 and permit the spring 97 to shift the associated shaft 93 so as to place the pin 95 in the slot 96 of the slide bar 91. This movement brings the grooved faces 102 into frictional engagement with the co-operating grooved faces 103 and forms an unyielding connection between the hand wheel 98 and sending device 17. Such a connection positively holds the valve operating lever 14 against movement by the master regulator. Movement of the master regulator and corresponding operation of the lever arm 12 merely results in compression of one or another of the springs 82, 84 in the yielding link. Rotation of the hand wheel 98 causes operation of the valve operating lever 14 and corresponding increase or decrease of the plant rating.

It will be apparent to those skilled in this particular art that the present invention can be employed in connection with furnaces using any type of coal feeder, or that it is equally applicable to installations employing pulverized fuel as well as those using liquid or gaseous fuels. It is equally apparent that the scope of this invention is not limited to use with boiled furnaces, but that it will be of equal utility for controlling the combustion in furnaces, singly or in groups, employed for purposes other than the generation of steam.

It will also be apparent that the regulator 42 is so constructed and arranged as to provide, in effect, a pressure relay mechanism whereby the variations in pressure in the pressure line associated with th master regulator are employed to produce proportionate pressure variations in a second pressure line associated with the individual boilers, and that these latter variations are employed for controlling the combustion in the individual boilers, either separately or as a whole.

As a result of the invention herein described, a control panel with associated mechanism is located at each furnace unit so that an operator has immediate and complete control of each element which forms a factor in the combustion for that particular furnace. Also, each local panel unit is influenced by the centrally located control mechanism associated with the steam pressure actuated master control which automatically determines the rating at which all furnaces must operate and which coordinates the operations of the various furnaces in order to meet the station load demand. The manual controls permit the hand adjusting of the rating on any given furnace unit independently of the rating on the plant as a whole and independently of the rating on every other furnace unit. Such adjustments are made only from the local panels associated with each of the furnace units. In case of emergency, the entire plant can be instantly changed from automatic to manual control through the above described mechanism located at the master panel.

Although I have illustrated and described in specific detail one embodiment of this invention as applied to the specific purpose of generating steam, it will be apparent that various changes, additions, omissions and substitutions can be made in the construction and application thereof without departing from the spirit of this invention or the scope of the appended claims.

What I claim as new and desire to secure by Letters Patent is:

1. The combination with a plurality of furnace units of air and fuel supply mechanisms associated with each of said furnaces, means for controlling the operation of each of said mechanisms, a regulator associated with each furnace for controlling the operation of said means, a master regulator responsive to plant output for controlling the operation of said first named regulators and means for manually operating said first named regulators independently of said master regulator.

2. The combination in a control system including a pressure line, of means operated by variations in the plant load for varying the pressure in said line, a second pressure line and a pressure relay having a movable member responsive to variations in the pressure in said first pressure line, a valve for controlling the pressure in said second pressure line, a connection for operating said valve upon movement of said member and means for varying the degree of movement of said member with relation to said valve.

3. The combination with separate pressure lines of a pressure relay for transmitting pressure variations from one of said pressure lines to the other of said pressure lines including a valve for controlling the pressure in said second pressure line, a bellows connected to said first pressure line, means actuated by expansion or contraction of said bellows for operating said valve to increase or decrease the pressure in said second pressure line directly in accordance with increases or decreases in the pressure in said first pressure line, and a second bellows responsive to the pressure in said second pressure line for establishing a condition of equilibrium after the variation in pressure in said first pressure line has been transmitted to said second pressure line.

4. The combination with separate pressure lines, of a pressure relay for transmitting pressure variations from one of said lines to the other of said pressure lines including a valve for controlling the pressure in said second pressure line, a bellows connected to said first pressure line and adapted to expand and contract in accordance with increases and decreases of pressure therein, a valve operating lever actuated by expansion or contraction of said bellows for operating said valve so as to cause corresponding increases and decreases in pressure in said second pressure line in substantially direct proportions, and a second bellows associated with said lever and connected to said second pressure line for closing said valve after the change in pressure in said second pressure line has been effected.

5. The combination with separate pressure lines of a pressure relay for transmitting pressure variations from one of said lines to the other of said pressure lines including a valve for controlling the pressure in said second pressure line, a bellows connected to said first pressure line and adapted to expand and contract in accordance with pressure variations therein, a valve operating lever actuated by expansion or contraction of said bellows for operating said valve so as to cause a corresponding variation in pressure in said second pressure line, a second bellows associated with said lever and connected to said second pressure line for closing said valve after the change in pressure in said second pressure line has been effected, separate springs bearing on each of said bellows and means for varying the pressure on each spring so as to control the proportion of the change in pressure in one line with relation to the change in the other.

6. In combination with a plurality of boiler furnaces feeding steam to a common header and separate fuel and air supply means for each of the furnaces, of a master regulator responsive to variations in pressure in the main header, a local master regulator for each furnace having means for rendering the same responsive to the master regulator, control devices for each furnace for regulating the fuel and air supply means therefor, regulators for each furnace responsive to the local master regulator for controlling the operation of each of the control devices regulating the air and fuel supply means, said local master regulators and the regulators controlled thereby being operated substantially in direct accordance with the operation of the master regulator, and means for modifying the response to each of said local master regulators to the action of the master regulator.

In testimony whereof, I have hereunto subscribed my name this 7th day of May, 1929.

THOMAS A. PEEBLES.